United States Patent [19]

Inaba et al.

[11] Patent Number: 6,111,390
[45] Date of Patent: Aug. 29, 2000

[54] MAGNETO-EQUIPPED POWER DEVICE

[75] Inventors: Yutaka Inaba; Tetsuya Kondo, both of Numazu, Japan

[73] Assignee: Kokusan Kenki Co., Ltd., Numazu, Japan

[21] Appl. No.: 09/226,724

[22] Filed: Jan. 7, 1999

[30] Foreign Application Priority Data

Jan. 20, 1998 [JP] Japan .................................. 10-009024
Feb. 13, 1998 [JP] Japan .................................. 10-031422

[51] Int. Cl.[7] ............................ H02H 7/06; H02K 21/12; H02K 11/00; H02K 1/00; H02K 1/22
[52] U.S. Cl. ......................... 322/28; 310/156; 310/68 D; 310/198; 310/267
[58] Field of Search .................................. 322/28, 21, 25, 322/27, 33, 37, 59, 60, 66, 75, 80, 93; 310/156, 68 D, 261, 267, 68 R, 72, 73, 68 C, 180, 181, 191, 198; 323/204, 220, 223; 318/100, 801, 805, 806

[56] References Cited

U.S. PATENT DOCUMENTS

| | | | |
|---|---|---|---|
| 4,087,736 | 5/1978 | Mori et al. ................................. | 322/28 |
| 4,258,307 | 3/1981 | Mori et al. ................................. | 322/28 |
| 4,401,937 | 8/1983 | Morishita ................................... | 322/28 |
| 4,594,631 | 6/1986 | Iwaki ......................................... | 361/20 |
| 4,618,811 | 10/1986 | Mashino et al. ........................... | 322/28 |
| 4,679,112 | 7/1987 | Craig ......................................... | 361/33 |
| 4,808,866 | 2/1989 | Kawazoe et al. ...................... | 310/68 D |
| 4,831,322 | 5/1989 | Mashino et al. ........................... | 322/28 |
| 5,297,014 | 3/1994 | Saito et al. ................................ | 363/21 |
| 5,455,500 | 10/1995 | Shichijyo et al. ......................... | 322/90 |
| 5,467,008 | 11/1995 | Uchinami ................................... | 322/27 |
| 5,512,813 | 4/1996 | Uchinami ................................... | 322/28 |
| 5,719,487 | 2/1998 | Sato et al. ................................. | 322/28 |
| 5,757,164 | 5/1998 | Yoshizaki et al. ......................... | 322/8 |
| 5,767,601 | 6/1998 | Uchiyama ................................ | 310/190 |
| 5,780,995 | 7/1998 | Maggioni et al. .......................... | 322/8 |

FOREIGN PATENT DOCUMENTS

59319/1995 of 1995 Japan .

*Primary Examiner*—Nestor Ramirez
*Assistant Examiner*—Dang Dinh Le
*Attorney, Agent, or Firm*—Pearne, Gordon, McCoy & Granger LLP

[57] ABSTRACT

A power device including a magneto and a rectification circuit for rectifying an output of the magneto is provided which is capable of adjusting an output of the magneto without any specific control circuit. A field adjusting excitation coil is arranged on a side of a stator of the magneto so as to generate a field adjusting magnetic flux when it is excited, resulting in a magnet field of the magneto being varied by means of the magnetic flux. The field adjusting excitation coil is connected to an intermediate portion of a current flow circuit for a load current, to thereby be excited by the load current, so that a magnet field of a rotor of the magneto is varied depending on the load current, leading to adjustment of an output of the magneto.

6 Claims, 10 Drawing Sheets

MAGNETO-EQUIPPED POWER DEVICE

BACKGROUND OF THE INVENTION

This invention relates to a magneto-equipped power device, and more particularly to a power device adapted to feed a DC power to a load by means of an output of a magneto.

A power device for a vehicle or the like which is driven by an internal combustion engine is typically constructed so as to convert an output of a magneto driven by the internal combustion engine into a DC power through a rectification circuit.

As commonly known in the art, a magneto is generally constituted of a rotor having a magnet field and a stator including armature coils, wherein the rotor is mounted on a prime mover of an internal combustion engine or the like. In the magneto thus constructed, a variation in magnetic flux produced due to rotation of the rotor permits an AC voltage to be induced across the armature coils.

In a power device using a generator as a power supply, it is generally required to restrain an output of the generator or isolate the generator from a load in order to protect the load. In particular, when a magneto driven by an internal combustion engine mounted on a vehicle or the like is used as a power supply for the power device, the magneto is substantially varied in rotational speed with a variation in rotational speed of the engine. Also, the magneto is increased in output with an increase in rotational speed thereof. Thus, in order to protect the load, it is required to keep an output of the magneto at a predetermined level or below.

Also, even when the magneto is operated while keeping a rotational speed thereof at a constant level, the load is often caused to be excessively increased in voltage across the load or load current or increased in load temperature beyond an allowable level depending on a state of the load, so that it is required to take a step necessary to protect the load.

Conventionally, the power device using the magneto employs two types of output control systems for the purpose of protecting the load. One of the systems is the output short-circuit type wherein an output of the armature coils is short-circuited to restrain an output of the magneto when the load falls into a state of requiring to restrain an output of the magneto. The other system is the load release type wherein the load is released from the magneto when any situation of requiring to protect the load occurs.

The conventional power device employing the output control system of the output short-circuit type includes a rectification circuit for rectifying an output of the magneto to feed it to the load, an output short-circuiting circuit for substantially short-circuiting an output of the armature coils of the magneto through output short-circuiting switches when it is fed with a control signal to flow a DC short-circuit current therethrough, and a switch control circuit for feeding a control signal to the output short-circuit switches when it is detected that the load falls into a state of requiring to restrain an output of the magneto, whereby the output short-circuit switches are turned on when it is detected that the load falls into a state of requiring to restrain an output of the magneto, to thereby short-circuit an output of the magneto, resulting in restraining an output of the magneto.

The power device employing the output control system of the load release type uses a rectification circuit for rectifying an output of the magneto which is constituted of a control rectification circuit using thyristors as switching elements, whereby the thyristors of the control rectification circuit are turned off when a voltage across the load exceeds a predetermined level or a current of the load exceeds a predetermined level, to thereby release the load from the magneto, resulting in the load voltage or load current being kept at the predetermined level or below.

In the conventional power device employing the output control system of the output short-circuit type, the output short-circuit switches are turned on while the magneto generates a voltage of an increased level, leading to flowing of a short-circuit current therethrough, so that it is required to increase a current capacity of the output short-circuit switches, resulting in the power device being increased in cost. Also, this causes an increase in short-circuit current flowing through the output short-circuit switches, leading to an increase in generation of heat from the output short-circuit switches, resulting in requiring arrangement of a large-sized heat sink for the output circuit switches, so that the power device is increased in size.

In the power device employing the output control system of the load release type, the thyristors of the control rectification circuit are kept turned off during a high-speed operation of the internal combustion engine for which the magneto is increased in no-load output voltage, resulting in an increased no-load voltage of the magneto being applied to the thyristors. This needs to increase dielectric properties of the thyristors for the control rectification circuit, leading to an increase in cost of the thyristors and therefore the power device.

Another power device is proposed as disclosed in Japanese Patent Application Laid-Open Publication No. 59319/1995. The power device proposed is so constructed that a field adjusting excitation coil for flowing a magnetic flux through magnetic poles on a side of a rotor (hereinafter referred to as "rotor-side magnetic poles") of a magneto and those on a side of a stator (hereinafter referred to as "stator-side magnetic poles") thereof is arranged on a side of the stator and a magnet field of the rotor is increased when a magnetic flux is fed from the field adjusting excitation coil thereto, whereby the field adjusting excitation coil is excited when a load which is increased to a high level is driven, to thereby increase an output of the magneto. In the power device thus constructed, an output of the magneto is fed through a rectifier to a battery, so that an output voltage of the battery is applied to the load, as well as to the field adjusting excitation coil through a switch. When the load is reduced, the field adjusting excitation coil is released or separated from the battery, to thereby be rendered non-excited, to thereby decrease a magnet field of the rotor, resulting in preventing an output of the magneto from being excessive. When the load is increased, the switch is closed to excite the field adjusting excitation coil by means of an output of the battery, to thereby increase the magnet field, leading to an increase in output of the magneto.

Thus, the power device is constructed so as to excite the field adjusting excitation coil to increase an output of the magneto when the load is increased and render the field adjusting excitation coil non-excited to restrain an output of the magneto when the load is decreased. Such construction permits an output of the generator to be controlled depending on a state of the load without short-circuiting an output of the magneto or isolating the load from the magneto.

However, the power device fails to finely adjust an output of the magneto depending on a magnitude of the load, because an excitation current fed to the field adjusting excitation coil is determined depending on a voltage across the battery charged by the magneto.

In order to finely adjust an output of the magneto, it would be considered to arrange a control circuit including a detection circuit for detecting a load current or a load voltage and an excitation current adjusting circuit for adjusting a magnitude of an excitation current flowing through the field adjusting excitation coil depending on a detection signal outputted from the detection circuit, to thereby control a magnitude of the excitation current. However, arrangement of such a control circuit for controlling a magnitude of an excitation current flowing through the field adjusting excitation coil renders the power device complicated in structure.

SUMMARY OF THE INVENTION

The present invention has been made in view of the foregoing disadvantage of the prior art.

Accordingly, it is an object of the present invention to provide a power device using a magneto provided on a side of a stator thereof with a field adjusting excitation coil as a power supply which is capable of firmly controlling an output of the magneto depending on a state of a load while being prevented from being complicated in structure.

It is another object of the present invention to provide a power device using a magneto provided on a side of a stator thereof with a field adjusting excitation coil as a power supply which is capable of keeping a voltage across a load at a predetermined level or below while preventing an excessive amount of current from flowing through output short-circuit switches.

In accordance with the present invention, a magneto-equipped power device is provided which is adapted to rectify an output of a magneto to feed a DC electric power to a load.

The power device includes a magneto including a magnet field on a side of a rotor and armature coils on a side of a stator and including a field adjusting excitation coil for flowing a field adjusting magnetic flux through rotor-side magnetic poles and stator-side magnetic poles when it is excited. The field adjusting excitation coil is arranged on the side of the stator. The power device also includes a current feed circuit arranged so as to permit a field adjusting current obtained by rectification of an output of the magneto to be flowed through the field adjusting excitation coil. The magnet field of the rotor of the magneto is varied when the field adjusting excitation coil is excited to generate the field adjusting magnetic flux.

The construction of the present invention which permits a field adjusting current obtained by rectification of an output of the magneto to be flowed through the field adjusting excitation coil, to thereby vary the magnet field depending on a magnitude of the field adjusting current permits an output of the magneto to be automatically adjusted depending on a magnitude of the load or the like by suitably setting an output of the magneto at the time when the field adjusting excitation coil is kept non-excited and the number of windings of the field adjusting excitation coil.

For example, when the present invention is so constructed that a current flowing from the magneto through the load is flowed as a field adjusting current through the field adjusting excitation coil, a magnet field of the magneto may be varied depending on the load current, to thereby vary an output of the magneto with a variation in load current. Thus, suitable setting of both an output of the magneto when the field adjusting excitation coil is kept non-excited and the number of windings of the field adjusting excitation coil permits an output of the magneto to be varied depending on the load without requiring any specific control circuit, resulting in an output of the magneto being adjusted to a magnitude corresponding to the load. Also, such construction permits an output of the magneto to be continuously varied with a variation in load current, so that an output of the magneto may be finely adjusted depending on a magnitude of the load.

Such an increase in magnet field due to excitation of the field adjusting excitation coil permits the field adjusting magnetic flux to be saturated at a certain level without being infinitely increased. Also, an increase in output of the magneto is restrained by an armature reaction. Thus, an output of the magneto is kept from being infinitely increased and is saturated at a certain level, in spite of the construction of the present invention that the magnet field is increased depending on a magnitude of the load current.

Also, in the present invention, excitation of the field adjusting excitation coil by the load current leads to a reduction in magnet field depending on the load current. This permits a reduction in magnet field to be increased due to an increase in load current, to thereby restrain an output of the magneto and to be decreased due to a decrease in load current, leading to an increase in output of the magneto, so that the load current may be kept constant with respect to a variation in load.

As described above, the present invention permits an output of the magneto to be adjusted without requiring any output short-circuiting circuit for short-circuiting an output of the magneto, when the load falls into a state of requiring to restrain an output of the magneto. Whereas, when such a short-circuiting circuit is arranged, the present invention may be constructed in such a manner that the field adjusting excitation coil is connected to an intermediate portion of the output short-circuiting circuit and a magnet field of the rotor is decreased when the field adjusting magnetic flux is generated. Such construction exhibits significant advantages.

More particularly, when the load falls into a state of requiring to restrain an output of the magneto to short-circuit the output through the output short-circuiting circuit, a short-circuit current flowing through the output short-circuiting circuit may be flowed as a field adjusting current through the field adjusting excitation coil to reduce a magnet field of the rotor. This effectively restrains an output of the magneto without flowing a large amount of short-circuit current through the output short-circuiting circuit. This permits the output short-circuit switches arranged in the output short-circuiting circuit to be reduced in current capacity and cost. Also, this significantly restricts flowing of a current through the output short-circuiting circuit, to thereby reduce generation of heat from the switches, leading to a reduction in size of a heat sink for the switches and therefore the power device.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a magneto-equipped power device according to the present invention will be described with reference to the accompanying drawings.

Figure 1:
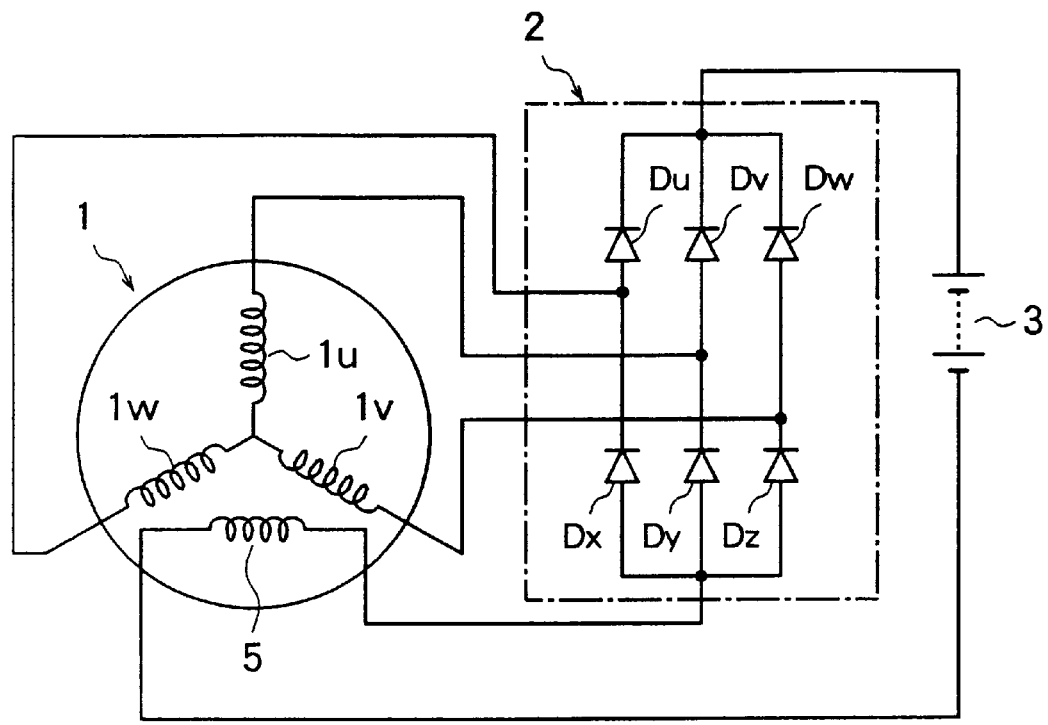
FIG. 1 is a circuit diagram showing an embodiment of a magneto-equipped power device according to the present invention.

Referring first to FIG. 1, an embodiment of a magneto-equipped power device according to the present invention is illustrated. In FIG. 1, reference numeral 1 designates a magneto, 2 is a rectification circuit constituted by a diode bridge full-wave rectification circuit, and 3 is a battery. Such components of the magneto-equipped power device may be constructed in substantially the same manner as in the prior art. The battery 3 has a load such as a lamp, an ignition unit for an internal combustion engine or the like connected thereto.

The magneto 1 is provided on a side of a stator thereof with a field adjusting excitation coil 5, so that a field adjusting magnetic flux may be flowed through magnetic poles on a side of a stator of the magneto or stator-side magnetic poles and those on a side of the rotor or rotor-side magnetic poles when excitation coil 5 is excited.

In the illustrated embodiment of FIG. 1, the field adjusting excitation coil 5 is connected at one end thereof to a negative terminal of the battery 3 and at the other end thereof to a negative output terminal of the rectification circuit 2, resulting in being connected to an intermediate portion of a current feed circuit for a load current, to thereby be excited by the load current.

In the illustrated embodiment, a direction in which the field adjusting excitation coil 5 is wound is so determined that excitation of the field adjusting excitation coil 5 by the load current permits a magnetic flux to flow through the rotor-side magnetic poles and stator-side magnetic poles, to thereby increase a magnet field of the rotor.

In order to facilitate adjustment of the magnet field by excitation of the field adjusting excitation coil 5, the magneto 1 includes a rotor and a stator which are preferably constructed in such a manner as described hereinafter. More particularly, the rotor includes a rotor yoke which is formed into a cup-like shape, resulting in including a peripheral wall and a bottom wall and is provided on a central portion of the bottom wall thereof with a boss section for mounting of a revolving shaft. The rotor also includes a plurality of arcuate permanent magnets which are fixed on an inner peripheral surface of the peripheral wall of the rotor yoke while being arranged in a peripheral direction of the rotor yoke and are magnetized at the same polarity in a radial direction thereof, as well as ferromagnetic blocks of an arcuate shape each arranged between each adjacent two of the permanent magnets and fixed on the inner peripheral surface of the peripheral wall of the rotor yoke. The permanent magnets and ferromagnetic blocks thus arranged each have an inner peripheral surface constituting each of the rotor-side magnetic poles. The stator includes an armature core having the stator-side magnetic poles which are opposite to the rotor-side magnetic poles, armature coils wound on the armature core, and the field adjusting excitation coil arranged so as to flow a field adjusting magnetic flux through the rotor-side magnetic poles and stator-side magnetic poles when it is excited.

When the boss section for mounting of the revolving shaft is provided on the bottom wall of the rotor yoke of the magneto as described above, the field adjusting excitation coil 5 may be constituted by a coil wound so as to concentrically surround the boss section of the rotor yoke.

Figure 12:
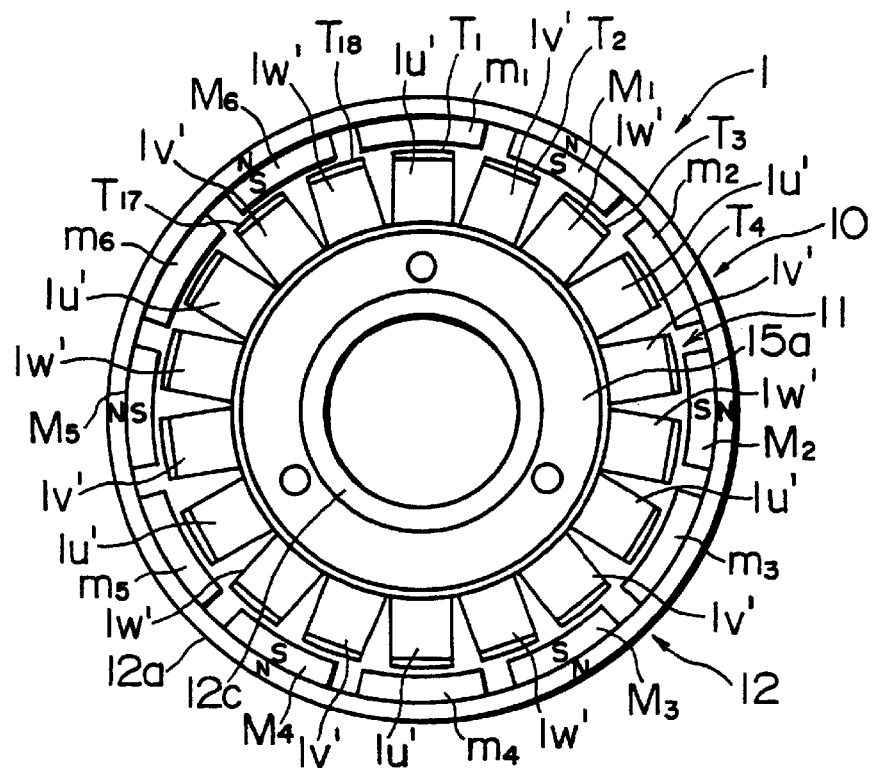
FIG. 12 is a front elevation view showing a preferred structure of a magneto incorporated in a magneto-equipped power device according to the present invention.
Figure 13:
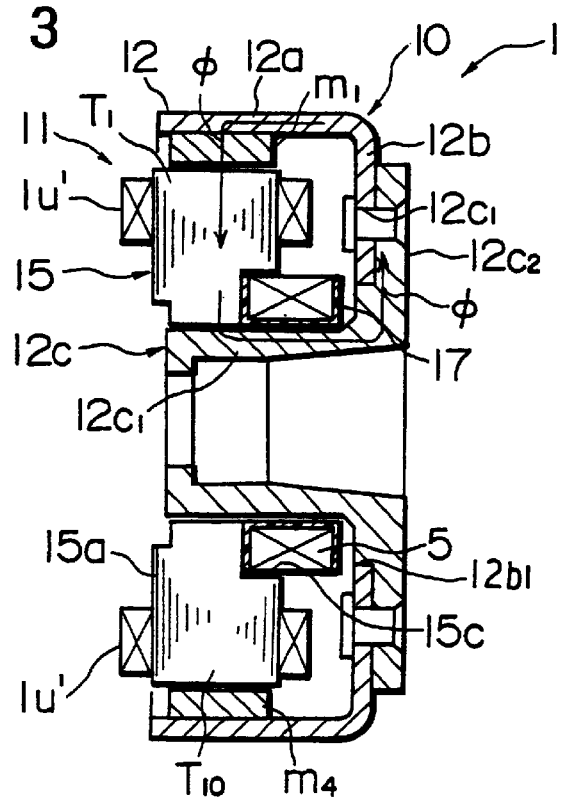
FIG. 13 is a vertical sectional view of the magneto of FIG. 12 showing flowing of a field adjusting magnetic flux therethrough in a direction which permits an increase in magnet field.

The magneto incorporated in the power device shown in FIG. 1 may be constructed, for example, in such a manner as shown in FIGS. 12 and 13. A magneto shown in FIGS. 12 and 13 is so constructed that the number of rotor-side magnetic poles is 2n (n=6) and that of stator-side magnetic poles is 3n, resulting in each adjacent two of the rotor-side magnetic poles being opposite to each adjacent three of the stator-side magnetic poles arranged in a manner to be successive in the peripheral direction, to thereby induce a three-phase output. In FIGS. 12 and 13, reference numeral 10 designates a rotor and 11 is a stator.

The rotor 10 includes a rotor yoke 12 made of iron and formed into a substantially a cup-like shape, resulting in including a peripheral wall 12a and a bottom wall 12b. The rotor yoke 12 is provided on a central portion of the bottom wall 12b thereof with a boss section 12c1 for mounting of a revolving shaft. The rotor 10 also includes permanent magnets M1 to M6 of an arcuate shape of n (n: an integer) in number. In FIGS. 12 and 13, six such permanent magnets are arranged. The permanent magnets are fixed on an inner peripheral surface of the peripheral wall 12a of the rotor yoke 12 while being arranged at equal angular intervals in a peripheral direction of the rotor yoke 12 and are magnetized at the same polarity in a radial direction thereof. The rotor 10 further includes ferromagnetic blocks m1 to m6 of an arcuate shape of n in number each arranged between each adjacent two of the permanent magnets and fixed on the inner peripheral surface of the peripheral wall of the rotor 12. In the illustrated embodiment, the integer n is set to be 6. In the rotor 10 thus constructed, the permanent magnets M1 to M6 and ferromagnetic blocks m1 to m6 cooperate with each other to constitute a magnet field having twelve (12) poles. Also, inner peripheral surfaces of the permanent magnets M1 to M6 and those of the ferromagnetic blocks m1 to m6 constitute rotor-side magnetic poles.

The rotor yoke 12 includes a yoke body constituted of the peripheral wall 12a and bottom wall 12b, as well as a boss member 12c mounted on the bottom wall 12b of the yoke body. The yoke body is made by forming an iron sheet into a cup-like shape by drawing. The bottom wall 12b of the yoke body is formed at a central portion thereof with a hole 12b1. The boss member 12c includes the boss section 12c1 of a cylindrical shape and a flange section 12c2 provided on one end of the boss section 12c1 in an axial direction thereof. The boss section 12c1 is inserted into the peripheral wall 12a through the hole 12b1 formed through the central portion of the bottom wall 12b of the rotor yoke 12, resulting in being arranged in a manner to be concentric with the peripheral wall 12a and the flange section 12c2 is riveted on the bottom wall 12b of the rotor yoke 12. The boss section 12c1 is formed therein with a shaft fit hole tapered, in which a tapered distal end of a revolving shaft of an internal combustion engine (not shown) is fitted, so that the rotor yoke 12 is mounted on the revolving shaft of the internal combustion engine. In the illustrated embodiment, the shaft fit hole of the boss section 12c1 is so tapered that the rotor yoke 12 is mounted on the revolving shaft of the internal combustion engine while keeping an opening thereof facing in an opposite direction to a casing of the engine.

The permanent magnets M1 to M6 are formed into an arcuate shape and fixed on the peripheral wall 12a of the rotor yoke 12 by adhesion or the like while being arranged at equal angular intervals on the inner peripheral surface of the peripheral wall 12a of the rotor yoke 12. In the illustrated embodiment, the permanent magnets each are magnetized at the same polarity in a radial direction of the rotor yoke 12 so that an N pole and an S pole appear on an outer peripheral surface of each of the permanent magnets and an inner peripheral surface thereof, respectively.

The ferromagnetic blocks m1 to m6 each are constituted of an iron element formed into an arcuate shape and fixed on the peripheral wall 12a of the rotor yoke 12 by adhesion or the like, so that a magnetic pole (for example, an N pole) opposite to that (for example, an S pole) of the permanent magnet appearing on the inner peripheral surface of the permanent magnet may appear on an inner peripheral surface of each of the ferromagnetic blocks.

The stator 11 includes an armature core 15, armature coils 1u to 1w wound on the armature core 15 and a field adjusting excitation coil 5 fixed with respect to the armature core 15.

The armature core 15 includes a yoke section 15a formed into an annular shape and teeth T1 to T18 of 3n in number arranged on an outer periphery of the yoke section 15a in a manner to be radially projected therefrom, resulting in being a star-like annular core. In the illustrated embodiment, eighteen (18) such teeth are arranged. Also, each adjacent three of the teeth constitute each tooth group, resulting in six tooth groups (T1~T3), (T4~T6), . . . , (T16~T18) being provided in all. The three teeth constituting each of the tooth groups have unit armature coils 1u' to 1w' of U to W phases concentratedly wound thereon, respectively. The unit armature coils of the respective phases are connected in series, in parallel or in series-parallel to each other depending on intended use of the magneto, resulting in providing the armature coils 1u to 1w. In the illustrated embodiment, three-phase unit armature coils are subject to star-connection, resulting in output terminals being led out of a three-phase armature coil. Delta connection may be substituted for the star-connection.

The stator 11 is mounted in a cover (not shown) which is arranged so as to cover a led-out portion of the revolving shaft of the internal combustion while being arranged inside the rotor 10 in a manner to be concentric with the rotor so that a stator-side magnetic pole formed at a distal end of each of teeth of the armature core 15 is rendered opposite to each of the rotor-side magnetic poles through a predetermined gap.

The field adjusting excitation coil 5 is wound on an annular bobbin 17 arranged so as to surround an outer periphery of the boss section 12c1 through a gap. The bobbin 17 having the excitation coil 5 wound thereon is fixed with respect to the armature core 15 while being fitted in an annular recess 15c formed on one end of the yoke section 15a of the armature core 15 defined in an axial direction thereof and is arranged so as to concentrically surround the outer periphery of the boss section 12c1.

In the magneto of FIGS. 12 and 13 thus constructed, rotation of the rotor 10 causes alternation of magnetic fluxes interlinking the unit armature coils respectively constituting the armature coils 1u to 1w, so that a three-phase AC voltage may be induced across the armature coils 1u to 1w.

The AC voltage thus induced across the armature coils 1u to 1w is rectified by the rectification circuit 2 and then fed to the battery 3, resulting in the battery 3 being charged. A charge current of the battery 3 (or a load current of the magneto) is fed in the form of a field adjusting current to the field adjusting excitation coil 5. This results in the field adjusting excitation coil 5 being excited to generate a field adjusting magnetic flux ϕ as shown in FIG. 13, which flows through the bottom wall 12b and peripheral wall 12a of the rotor yoke 12, the permanent magnet, the armature core 15, and the boss section 12c1 of the rotor yoke. In the illustrated embodiment, a direction in which the excitation coil 5 is wound is so set that such flowing of the field adjusting magnetic flux ϕ permits an increase in magnet field of the rotor. Thus, an increase in charge current of the battery leads to an increase in output of the magneto and a decrease in charge current of the battery leads to a decrease in output of the magneto. When charging of the battery 3 is completed to render the charge current zero, the field adjusting excitation coil 5 is rendered non-excited, so that an output of the magneto is decreased to a lowermost level at a rotational speed of the engine at that time.

As described above, in the magneto shown in FIGS. 12 and 13, the rotor and stator are constructed into a 2n-pole (n: an integer) structure and a 3n-pole structure, respectively, and the silent poles of the stator each have the unit armature coil concentratedly wound thereon. Nevertheless, the illustrated embodiment is not limited to such a structure of the magneto.

Figure 14:
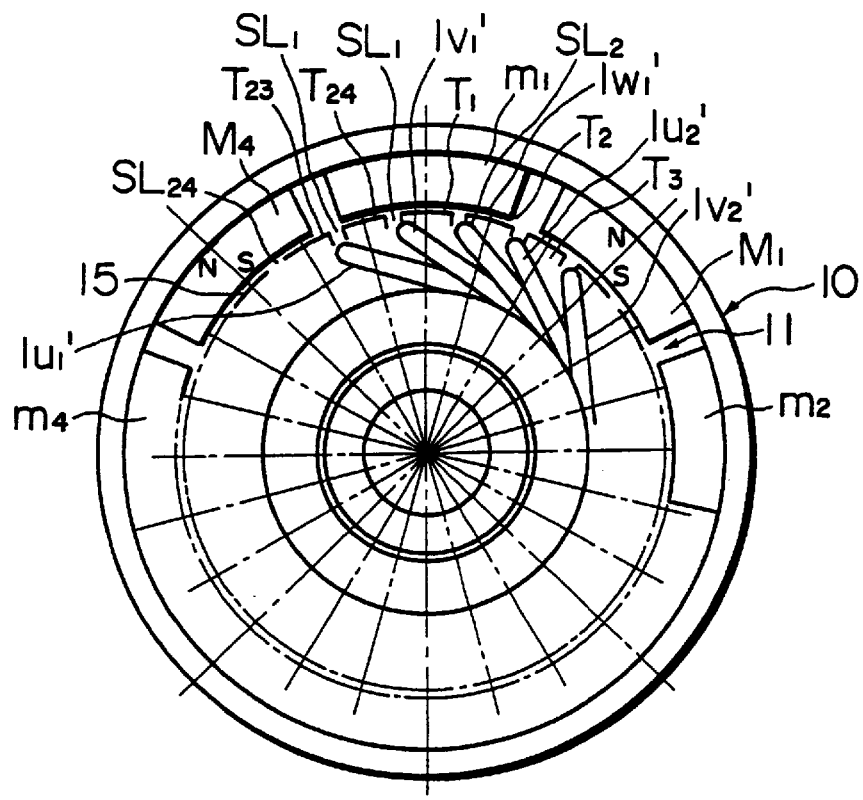
FIG. 14 a front elevation view showing another structure of a magneto which may be incorporated in a power device according to the present invention.
Figure 15:
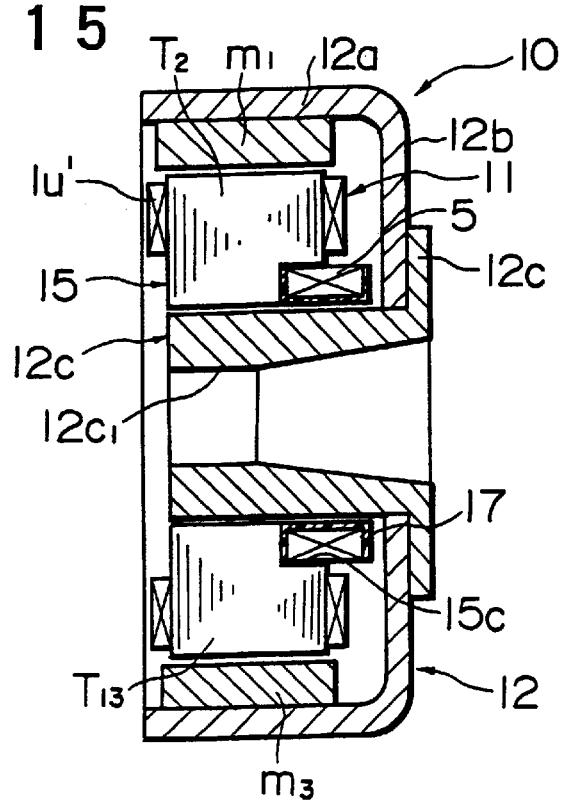
FIG. 15 a vertical sectional view of the magneto shown in FIG. 14.

Alternatively, the magneto incorporated in the illustrated embodiment may be in such a manner as shown in FIGS. 14 and 15. A magneto shown in FIGS. 14 and 15 includes a rotor 10 and stator 11. The rotor 10 is constructed into an eight-pole structure by cooperation of four permanent magnets M1 to M4 and four ferromagnetic blocks m1 to m4. An armature core 15 is constituted by an annular iron core provided on an outer periphery thereof with twenty-four teeth (stator-side magnetic poles) T1, T2, . . . , T24 and twenty-four slots SL1, SL2, . . . , SL24. Unit armature coils constituting three-phase or U-, V- and W-phase armature coils are formed by connecting first unit coils 1u1', 1v1' and 1w' each wound on each three teeth while extending thereover and second unit coils 1u2', 1v2' and 1w2' each wound on each three teeth adjacent to each three teeth of each of the first unit coils while extending thereover to each other in series. The first unit coil and second unit coil of each of the phases are wound in directions opposite to each other.

Twenty-four dashed lines radially drawn in FIG. 14 each indicates a central position of each of the teeth provided on the armature core 15, wherein eight dashed lines drawn so as to outwardly extend beyond an outer periphery of the rotor 10 each indicate a center of magnetic poles of the rotor.

Figure 16:
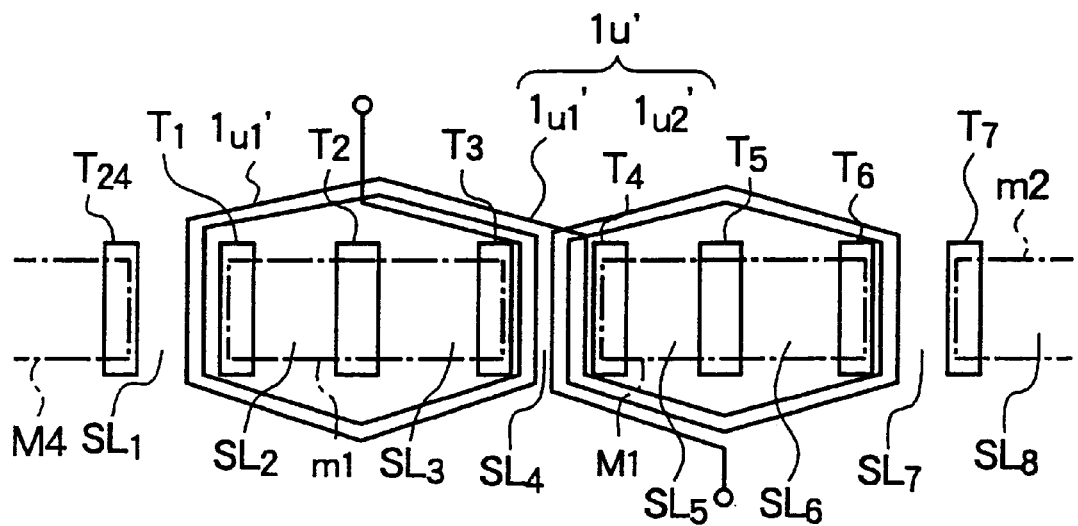
FIG. 16 is a diagrammatic view showing windings of the magneto shown in FIGS. 14 and 15.

Winding of the magneto shown in FIGS. 14 and 15 may be constructed in such a manner as shown in FIG. 16, in which the U-phase unit armature coil 1u' is shown by way of example. In FIG. 16, the first unit coil 1u1' is wound on the three teeth T1 to T3 through the slots SL1 and SL4 while extending thereover and the second unit coil 1u2' is wound on the three teeth T4 to T6 adjacent to one side of the teeth T1 to T3 (or a side thereof delayed on the basis of a direction of rotation of the rotor) through the slots SL4 and SL7 in a direction opposite to the first unit coil 1u1'. The first unit coil 1u1' and second unit coil 1u2' are connected in series to each other through a crossover, resulting in cooperating with each other to constitute the U-phase unit armature coil 1u'.

The V-phase unit armature coil (not shown in FIG. 16) is constituted by connecting the first unit coil 1v1' wound on the teeth T2 to T4 through the slots SL2 and SL5 in a direction opposite to the first unit coil 1u1' of the U-phase unit armature coil 1u1' while extending over the teeth T2 to T4 and the second unit coil 1v2' wound on the teeth T5 to T7 through the slots SL5 and SL8 in a direction opposite to the first unit coil 1v1' extending thereover to each other in series.

Also, the W-phase unit armature coil (not shown in FIG. 16) is constituted by connecting the first unit coil 1w1' wound on the teeth T3 to T5 through the slots SL3 and SL6 in a direction opposite to the first unit coil 1v1' of the V-phase unit armature coil 1v' while extending over the teeth T3 to T5 and the second unit coil 1w2' wound on the teeth T6 to T8 through the slots SL6 and SL9 in a direction opposite to the first unit coil 1w1' extending thereover to each other in series.

In the magneto shown in FIGS. 14 and 15, a field adjusting excitation coil 5 is wound on an annular bobbin 17 and fittedly held in a recess 15c of the armature core 15 as in the magneto shown in FIGS. 12 and 13.

The embodiment shown in FIG. 1 is constructed so as to feed the battery with a charge current while acting the battery as a load. It is a matter of course that the present invention may be applied to feeding of an electric power to a DC load other than such a battery.

Figure 2:
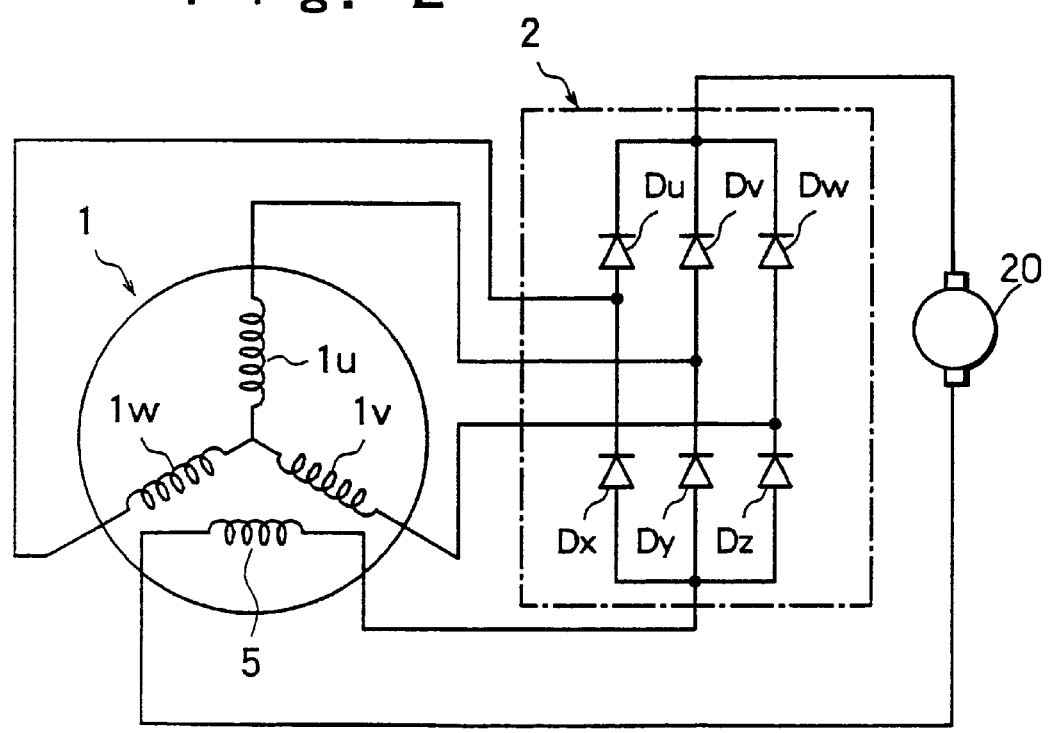
FIG. 2 is a circuit diagram showing another embodiment of a magneto-equipped power device according to the present invention.

For example, as shown in FIG. 2, the magneto-equipped power device of the present invention may be applied to driving of a DC motor 20 acting as a load. The DC motor 20 is decreased in rotational speed thereof with an increase in load thereof. However, the driving of the motor 20 by the power device of the present invention permits an excitation current of the field adjusting excitation coil 5 to be increased with an increase in armature current of the motor 20, to thereby increase an magnet field of the magneto 1, leading to an increase in output of the magneto, when the motor 20 is increased in load. This permits an electric power fed to the motor 20 to be increased, leading to an increase in output torque, so that the motor 20 may be restrained from being reduced in rotational speed thereof. Thus, the present invention ensures driving of the motor 20 at a substantially constant rotational speed irrespective of a magnitude of load thereof.

Figure 3:
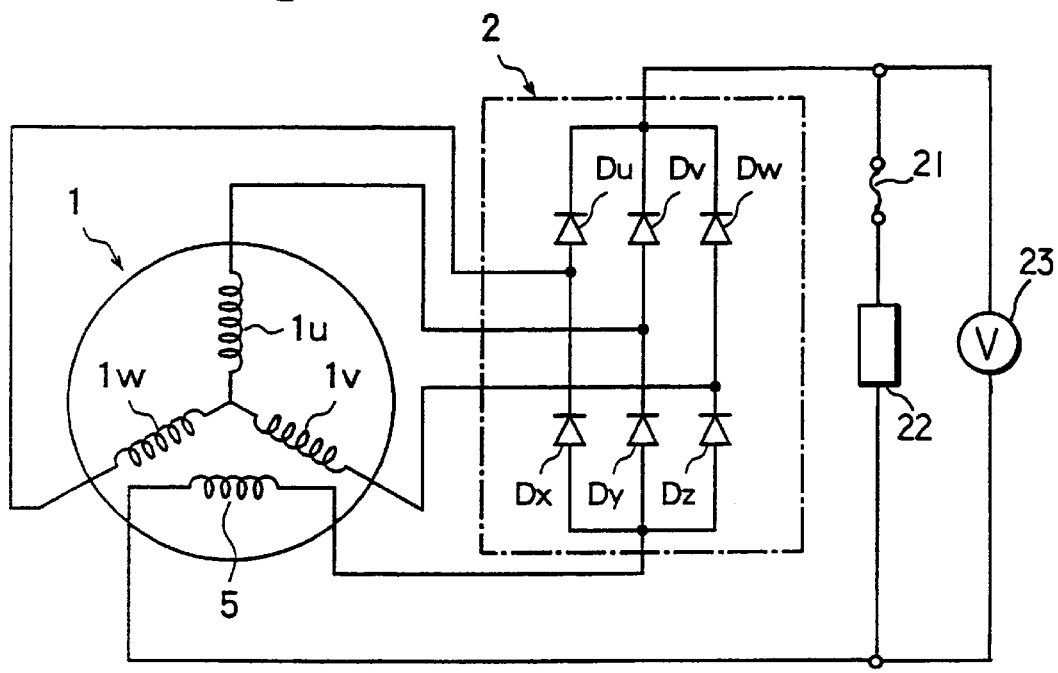
FIG. 3 is a circuit diagram showing a further embodiment of a magneto-equipped power device according to the present invention.

Also, the present invention may be constructed so as to excite the field adjusting excitation coil 5 to increase a magnet field of the rotor. In this instance, as shown in FIG. 3, a load 22 is connected between DC output terminals of the rectification circuit 2 through an overcurrent protection means such as a fuse, a breaker or the like. This, when a voltmeter 23 is connected between the DC output terminals of the rectification circuit 2, effectively protects the voltmeter from application of an overvoltage thereto. More specifically, such construction as shown in FIG. 3, when the load current is excessively increased to a level sufficient to interrupt the overcurrent protection unit 21, reduces a magnet field of the magneto 1 or prevents an increase in field of the magneto, to thereby reduce an output of the magneto, resulting in preventing induction of a voltage of an increased level between the DC output terminals of the rectification circuit 2. This prevents the voltmeter 23 connected between the DC output terminals of the rectification 2 from being broken due to application of an overvoltage thereto. The same advantage may be exhibited also when any other equipment is substituted for the voltmeter 23.

Figure 17:
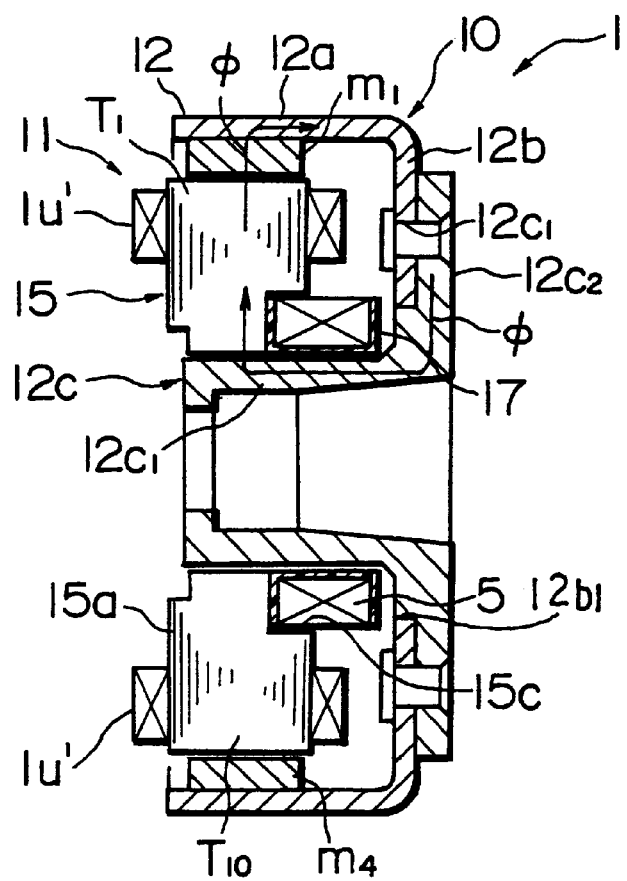
FIG. 17 is a vertical sectional view of the magneto of FIG. 12 showing flowing of a field adjusting magnetic flux therethrough in a direction which permits a decrease in magnet field.

In the illustrated embodiment, the direction of winding of the field adjusting excitation coil is so set that a magnetic flux flowing through the ferromagnetic block is increased when the field adjusting excitation coil 5 is excited by the load current to generate a field adjusting magnetic flux. Alternatively, depending on a load to be driven, a direction of winding of the field adjusting excitation coil 5 may be so set that a field adjusting magnetic flux $\phi$ in a direction of reducing a magnetic flux flowing through the ferromagnetic blocks or in a direction of reducing a magnet field of the magneto is generated when the field adjusting excitation coil is excited, as shown in FIG. 17. FIG. 17 is substantially the same as FIG. 13 except a direction of the field adjusting magnetic flux $\phi$.

Also, when the present invention, as described above, is so constructed that the field adjusting excitation coil 5 is excited by the load current to reduce the magnet field depending on the load current, a reduction in magnet field is increased with an increase in load current, to thereby restrain an increase in output of the magneto and is decreased with a reduction in load current, to thereby increase an output of the magneto, resulting in the load current being kept constant with respect to a variation in load.

For example, a DC generator of the separate excitation type is decreased in field current due to an increase in armature reaction thereof when a load current is increased, whereas it is decreased in field current due to a decrease in armature reaction thereof with a decrease in load current. Thus, in order to keep field force constant in spite of an armature reaction to ensure stable driving of the generator, it is required to arrange a control circuit for controlling a field current depending on the load current. However, feeding of a current to an excitation coil by means of the power supply of the present invention permits the field current to be kept constant without using any specific control circuit.

Also, the above-described construction of the present invention that the field adjusting excitation coil is excited by the load current to decrease the magnet field depending on the load current, when a resistor load such as an incandescent lamp, an electric heater or the like which generates heat due to feeing of a current thereto is driven while being still kept at a low temperature and therefore at a low resistance, effectively keeps an inrush current at an increased level from flowing through the load, to thereby prevent burning of the load due to the increased inrush current.

The above-described construction of the present invention that the field adjusting excitation coil is excited by the load current to decrease a magnet field of the magneto depending on the load current prevents the magnet field from being suddenly substantially decreased, to thereby ensure that a decrease in magnet field is gradually increased at a constant rate with an increase in load current. This results in ensuring smooth rising of an output of the magneto, leading to smooth driving of the magneto.

Figure 4:
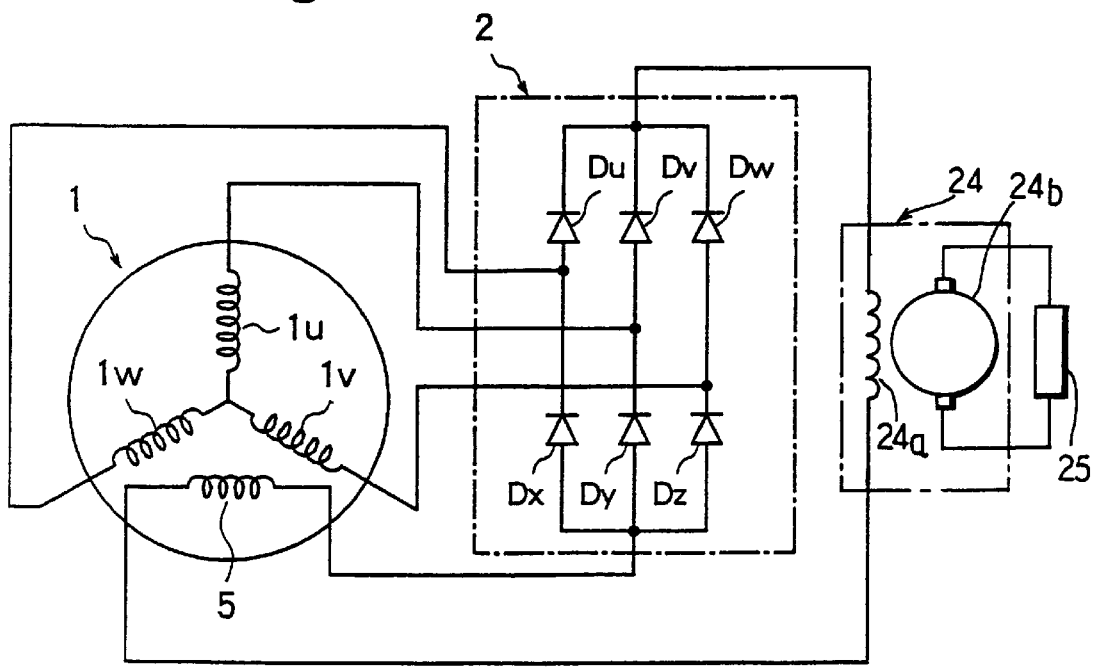
FIG. 4 is a circuit diagram showing still another embodiment of a magneto-equipped power device according to the present invention.
Figure 5:
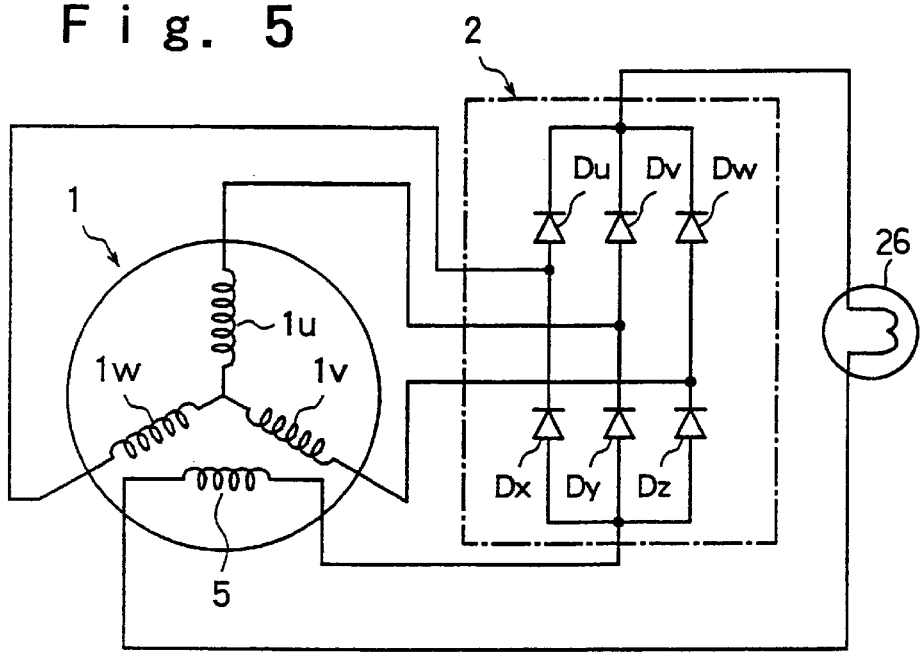
FIG. 5 is a circuit diagram showing yet another embodiment of a magneto-equipped power device according to the present invention.

Referring now to FIGS. 4 and 5, further embodiments of a power device according to the present invention are illustrated, each of which is constructed in such a manner that a direction of winding of a field adjusting excitation coil is set so as to decrease a magnet field depending on a load current, to thereby exhibit a specific advantage.

More particularly, in the embodiment shown in FIG. 4, a DC generator 24 of the separate excitation type is connected at a field coil 24a thereof between DC output terminals of a rectification circuit 2 and a load 25 is connected between output terminals of an armature 24b of the DC generator 24.

In the DC generator 24 of the separate excitation type, when a load current is increased due to an increase in load, a field current flowing through the field coil 24a is decreased due to an increase in armature reaction thereof, whereas a decrease in load current leads to a decrease in armature reaction, resulting in the field current being increased. Thus, in order to keep field force constant irrespective of the load current to ensure stable driving of the generator, it is required to control the field current depending on the load current. However the power device of the present invention permits the field current to be kept substantially constant without arrangement of any specific circuit control.

More specifically, the illustrated embodiment is constructed in such a manner that an excitation current is fed from a power device of the illustrated embodiment constructed so as to excite a field adjusting excitation coil 5 by a load current to decrease a magnet field depending on the load current to the DC generator 24 of the separate excitation type. Such construction, when an armature reaction is increased due to an increase in armature current with an increase in load of the DC generator 24, permits a decrease in magnet field of a magneto 1, to thereby increase an output of the magneto 1, leading to an increase in excitation current of the DC generator 24. Also, when the armature reaction is decreased due to a decrease in load of the DC generator 24, to thereby increase in field current, a decrease in magnet field of the magneto 1 is increased to decrease an output of the magneto, resulting in an excitation current of the DC generator 24 being reduced. Thus, a current flowing through the field coil 24a of the DC generator 24 of the separate excitation type is automatically kept constant with respect to a variation in output of the DC generator 24, to thereby ensure stable operation of the generator while keeping the field force of the DC generator.

In another embodiment shown in FIG. 5, an incandescent lamp 26 is connected between DC output terminals of a rectification circuit 2. When the incandescent lamp 26 is used as a load, it is decreased in resistance of a filament thereof prior to turning-on thereof, so that an inrush current at an increased level is caused to flow therethrough immediately after turning-on thereof. After the turning-on, the filament is increased in temperature, to thereby be increased in resistance, so that the load current is reduced, to thereby be kept at a constant level. In order to increase durability of the lamp 26, it is desired to restrain flowing of an inrush current therethrough immediately after the turning-on. In the case that the incandescent light 26 is to be turned on by the power device of the illustrated embodiment which is so constructed that a field adjusting excitation coil 5 is excited by a load current to reduce a magnet field of a magneto 1, the magnet field is reduced to restrain an output of the magneto, to thereby prevent an inrush current at an increased level from flowing through the lamp immediately after the turning-on. Also, even when a current flowing through the lamp tends to be reduced with an increase in resistance thereof after turning-on of the lamp, the magnet field is decreased to increase an output of the magneto 1, to thereby restrain a decrease in current flowing through the lamp. This permits a current flowing through the lamp 26 to be kept substantially constant from immediately after turning-on of the lamp 26 to a steady state thereof. The illustrated embodiment exhibits the same function and advantage also when it is applied to any heat-generating load such as an electric heater other than the incandescent lamp.

The illustrated embodiment permits a direction of a load current flowing through the field adjusting excitation coil 5 to be changed depending on a state of a load, to thereby appropriately control an output of the magneto depending on a current of the load or a voltage thereacross.

In order to accomplish such control, the power device of the present invention may be provided with a change-over switch circuit and a switch control circuit. The change-over switch circuit may be constructed so as to connect the current feed circuit for a load current flowing through the load from the rectification circuit and the field adjusting excitation coil to each other therethrough, resulting in being changed over between a first state of connecting the current feed circuit and field adjusting excitation coil to each other in series so as to permit the load current to be flowed from one end of the field adjusting excitation coil to the other end thereof and a second state of connecting the current feed circuit and field adjusting excitation coil to each other in series so as to permit the load current to be flowed from the other end of the field adjusting excitation coil to the one end thereof. The switch control circuit may be constructed so as to change over the change-over switch circuit depending on a current flowing through the load or a voltage thereacross.

Figure 6:
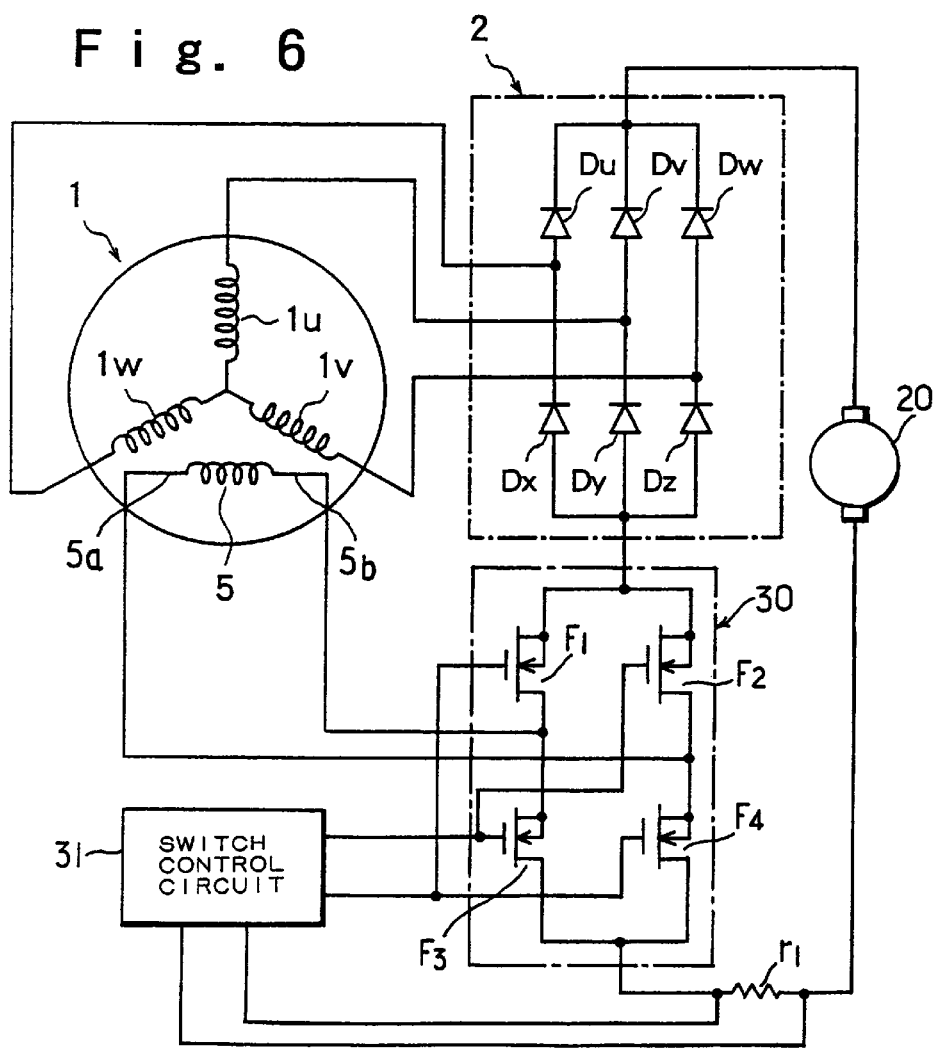
FIG. 6 is a circuit diagram showing even another embodiment of a magneto-equipped power device according to the present invention.

Referring now to FIG. 6, still another object of a power device according to the present invention is illustrated, which is constructed so as to carry out such control as described above. In FIG. 6, reference numeral 30 designate a change-over switch circuit and 31 is a switch control circuit. The change-over switch circuit 30 is constructed so as to connect a current feed circuit for a load current flowing through a load from a rectification circuit 2 and a field adjusting excitation coil 5 to each other therethrough, resulting in being changed over between a first state of connecting the current feed circuit and field adjusting excitation coil 5 to each other in series so as to permit a load current to be flowed from one end 5a of the field adjusting excitation coil 5 to the other end 5b thereof and a second state of connecting the current feed circuit and field adjusting excitation coil to each other in series so as to permit the load current to be flowed from the other end 5b of the field adjusting excitation coil 5 to the one end 5a thereof. The change-over switch circuit 30 is constituted by a MOSFET bridge circuit including first and second MOSFETs F1 and F2 of which sources are connected in common and third and fourth MOSFETs F3 and F4 of which drains are connected in common and sources are connected to drains of the first and second MOSFETs F1 and F2. In the illustrated embodiment, a common connection between the sources of the first and second MOSFETs F1 and F2 is connected to a negative-side DC output terminal of the rectification circuit 2. A positive-side DC output terminal of the rectification circuit 2 is connected to one of power terminals of a DC motor 20. A common connection between drains of the third and fourth MOSFETs F3 and F4 of the change-over switch circuit 30 is connected to the other power terminal of the motor 20 through a resistor r1 at a low level for current detection. In the illustrated embodiment, the first state is obtained when the MOSFETs F1 and F4 of the MOSFET bridge circuit positioned diagonally opposite to each other are kept turned on and the second state is obtained when the MOSFETs F2 and F3 likewise arranged diagonally opposite to each other are kept turned on.

The switch circuit 31 detects a load current from a voltage across the resistor r1, resulting controlling the change-over switch circuit 30 in a manner to maintain the change-over switch circuit 30 at the first state wherein the MOSFETs F1 and F4 are kept turned on and the MOSFETs F2 and F3 are turned off when the load current is at a predetermined level or below and at the second state wherein the MOSFETs F2 and F3 are kept turned on and the MOSFETs F1 and F4 are turned off when the load current exceeds the predetermined level.

As described above, the construction of the illustrated embodiment that the change-over switch circuit 30 and switch control circuit 31 are arranged to change a direction of the load current depending on a voltage across the load or the load permits the magnet field to be increased depending on an increase in load current during a steady state to feed a sufficient amount of electric power to the load and decreased to restrain an output of the magneto when the load current or the voltage across the load is excessively increased, resulting in protecting the load. When the DC motor 20 is driven as shown in FIG. 6, the change-over switch circuit 30 is changed over to a side on which the magnet field is increased by the load current during the steady state, resulting in accommodating to a variation in output torque of the motor. Also, when excessive load torque is applied to the motor 20, the change-over switch circuit 30 is changed over to a side on which the magnet field is decreased to prevent damage to the motor, to thereby relieve mechanical shock applied to the motor 20.

As described above, the field adjusting excitation coil 5 may be inserted into the passage or current feed circuit for the load current to excite the excitation coil 5 by means of the load current, to thereby vary the magnet field. Such construction permits an output of the magneto to be varied with a variation in load current. Thus, suitable setting of both an output of the magneto when the field adjusting excitation coil 5 is kept non-excited and the number of windings of the field adjusting excitation coil permits an output of the magneto to be varied depending on a magnitude of the load without arrangement of any specific control circuit, to thereby control an output of the magneto in correspondence to the load.

Also, the embodiments described above each are so constructed that the load current is flowed in the form of a field adjusting current through the field adjusting excitation coil 5. This eliminates a necessity of arranging any output short-circuiting circuit for short-circuiting an output of the magneto to adjust it, leading to an increase in generating efficiency thereof while minimizing loss.

Further, such construction permits an output of the magneto to be continuously varied with a variation in load current, so that an output of the magneto may be finely adjusted depending on a magnitude of the load.

Thus, the present invention permits an output of the magneto to be adjusted without any output short-circuiting circuit for short-circuiting an output of the magneto, when the load falls into a state of requiring to restrain an output of the magneto. Whereas, when such an output short-circuiting circuit is arranged, the present invention may be so constructed that the field adjusting excitation coil is arranged at or connected to an intermediate portion of the output short-circuiting circuit and a magnet field of the rotor is decreased when the field adjusting magnetic flux is generated. Such construction exhibits various advantages.

Figure 7:
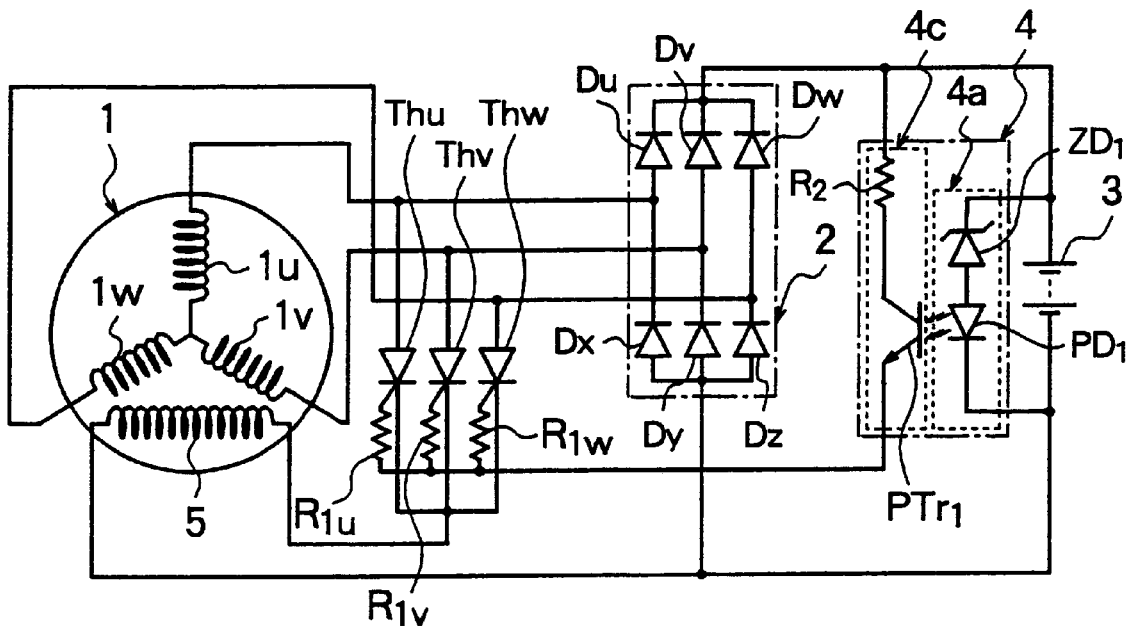
FIG. 7 is a circuit diagram showing a still further embodiment of a magneto-equipped power device according to the present invention.

Referring now to FIG. 7, yet another embodiment of a power device according to the present invention is illustrated. In FIG. 7, reference numeral 1 designates a magneto, 2 is a rectification circuit constituted by a diode bridge full-wave rectification circuit and 3 is a battery, which may be constructed in substantially the same manner as those of the power device shown in FIG. 1. The battery 1 has a load (not shown) such as a lamp, an ignition unit for an internal combustion engine or the like connected thereto.

The magneto 1 is provided on a side of a stator thereof with a field adjusting excitation coil 5, so that excitation of the field adjusting excitation coil 5 permits a field adjusting magnetic flux to flow through rotor-side magnetic poles and stator-side magnetic poles.

Also, the magneto 1 includes armature coils 1u to 1w, each of which is connected at a terminal thereof on a side of a non-neutral point thereof to an anode of each of output short-circuit thyristors Thu to Thw each constituting an output short-circuit switch. The thyristors Thu to Thw are connected at a cathode thereof to one end of the field adjusting excitation coil 5 in common. The field adjusting excitation coil 5 is connected at the other end thereof to a negative-side output terminal of the rectification circuit 2 or a common connection of anodes of diodes Dx to Dz constituting a lower side of a bridge of the rectification circuit 2, so that the output thyristors Thu to Thw, field adjusting excitation coil 5 and diodes Dx to Dz cooperate with each other to constitute an output short-circuiting circuit which functions to substantially short-circuit an output of the armature coils 1u to 1w of the magneto to permit a DC short-circuit current to flow through the thyristors Thu to Thw (output short-circuit switches) and field adjusting excitation coil 5.

Thus, in the power device of FIG. 7, the field adjusting excitation coil 5 is connected to an intermediate portion of the output short-circuiting circuit so as to be excited by the DC short-circuit current flowing through the output short-circuit switches Thu to Thw.

In the illustrated embodiment, a magnet field provided at the rotor of the magneto 1 is constructed so as to be decreased when a DC short-circuit current is flowed through the output short-circuiting circuit to excite the field adjusting excitation coil 5.

Reference numeral 4 designates a switch control circuit for controlling the output short-circuit thyristors Thu to Thw, which includes a photo coupler constituted of a light emitting diode PD1 and a phototransistor PTr1, a Zener diode ZD1 connected between an anode of the light emitting diode PD1 and a positive terminal of the battery 3 while keeping a cathode thereof facing the positive terminal of the battery 3, and a resistor R2 between a collector of the phototransistor PTr1 and the positive terminal of the battery 3. The phototransistor PTr1 has an emitter connected through resistors R1u to R1w to gates of the output short-circuit thyristors Thu to Thw, respectively.

In the illustrated embodiment, the Zener diode ZD1 of which the cathode is kept facing the positive terminal of the battery 3 and the light emitting diode PD1 cooperate with each other to form a series circuit, which constitutes a voltage detection circuit 4a for detecting a voltage across the battery 3. Also, the phototransistor PTr1 turned on upon detection of light emitted from the light emitting diode PD1 and the resistor R2 through which the collector of the phototransistor PTr1 is connected to the positive terminal of the battery 3 cooperate with each other to constitute a control signal generation circuit 4c.

In the power device of the illustrated embodiment, the magneto 1 may be constructed in substantially the same manner as that incorporated in each of the power devices shown in FIGS. 1 to 6. In the power device of FIG. 7, rotation of the rotor of the magneto 1 permits alternation of magnetic fluxes interlinking unit armature coils constituting the armature coils 1u to 1w of the stator 11, so that a three-phase AC voltage may be induced across the armature coils 1u to 1w.

The AC voltage thus induced across the armature coils 1u to 1w is rectified through the rectification circuit 2 and then fed to the battery 3, resulting in the battery 3 being charged. When a voltage across the battery 3 is at a set level determined by a Zener voltage of the Zener diode ZD1 or below, the Zener diode ZD1 is kept from being turned on, to thereby keep the phototransistor PTr1 turned off, so that the control signal generation circuit 4c may generate no control signal. In such a state, the output short-circuit thyristors Thu to Thw are fed with no trigger signal, to thereby fail in turning-on of the thyristors, so that an output of the generators 1 may be fed through the rectification circuit 2 to the battery (load) 3.

When charging of the battery 3 is advanced or a rotational speed of the magneto is increased to cause a voltage across the battery 3 to exceed the set level, the Zener diode ZD1 is turned on, to thereby permit the light emitting diode PD1 to emit light and the phototransistor PTr1 to be turned on. This results in a control signal being generated from the battery 3 through the resistor R2 and phototransistor PTr1, to thereby feed each of the thyristors Thu to Thw with a trigger signal. Thus, of the thyristors Thu to Thw, the thyristor of which an anode is kept at a positive voltage with respect to a cathode thereof is turned on, so that a DC short-circuit current may be flowed through the thyristor thus turned on, the field adjusting excitation coil 5 and any one of the diodes Dx to Dz constituting the lower side of the bridge of the rectification circuit 2. This permits a reduction in output voltage of the magneto obtained at the output terminal of each of the armature coils 1u to 1w, resulting in a voltage across the battery 3 being reduced. When a voltage across the battery 3 is reduced to the set level or below, the switch control circuit 4 stops outputting the control signal, so that the thyristors Thu to Thw each are turned off when an anode current thereof is reduced to a level below a holding current, resulting in short-circuiting of an output of the magneto being released. This leads to an increase in output of the magneto. Such operation is repeated, so that a voltage applied to the battery 3 may be kept at a level near the set level.

When the field adjusting excitation coil 5 is excited by means of a DC current flowing through the output short-circuit thyristors Thu to Thw, a field adjusting magnetic flux φ generated from the field adjusting excitation coil 5 is permitted to flow through a path extending from a boss section 12c1, through each of silent pole sections 15b (a stator-side magnetic pole) of an armature core 15, each of ferromagnetic blocks 14 (a rotor-side magnetic pole), a peripheral wall 12a of a rotor yoke 12 and a bottom wall 12b of the rotor yoke to the boss section 12c1, as shown in FIG. 17. In the power device shown in FIG. 7, the field adjusting excitation coil 5 is wound in a direction which is so determined that the field adjusting magnetic flux φ may flow in a direction opposite to a direction in which a magnetic flux flows from each of permanent magnets 13 through the ferromagnetic block adjacent thereto or may reduce a magnet field. Thus, when the field adjusting excitation coil 5 is excited, the amount of magnetic flux interlinking each of armature coils is reduced, resulting in an output of the magneto being decreased.

Figure 18:
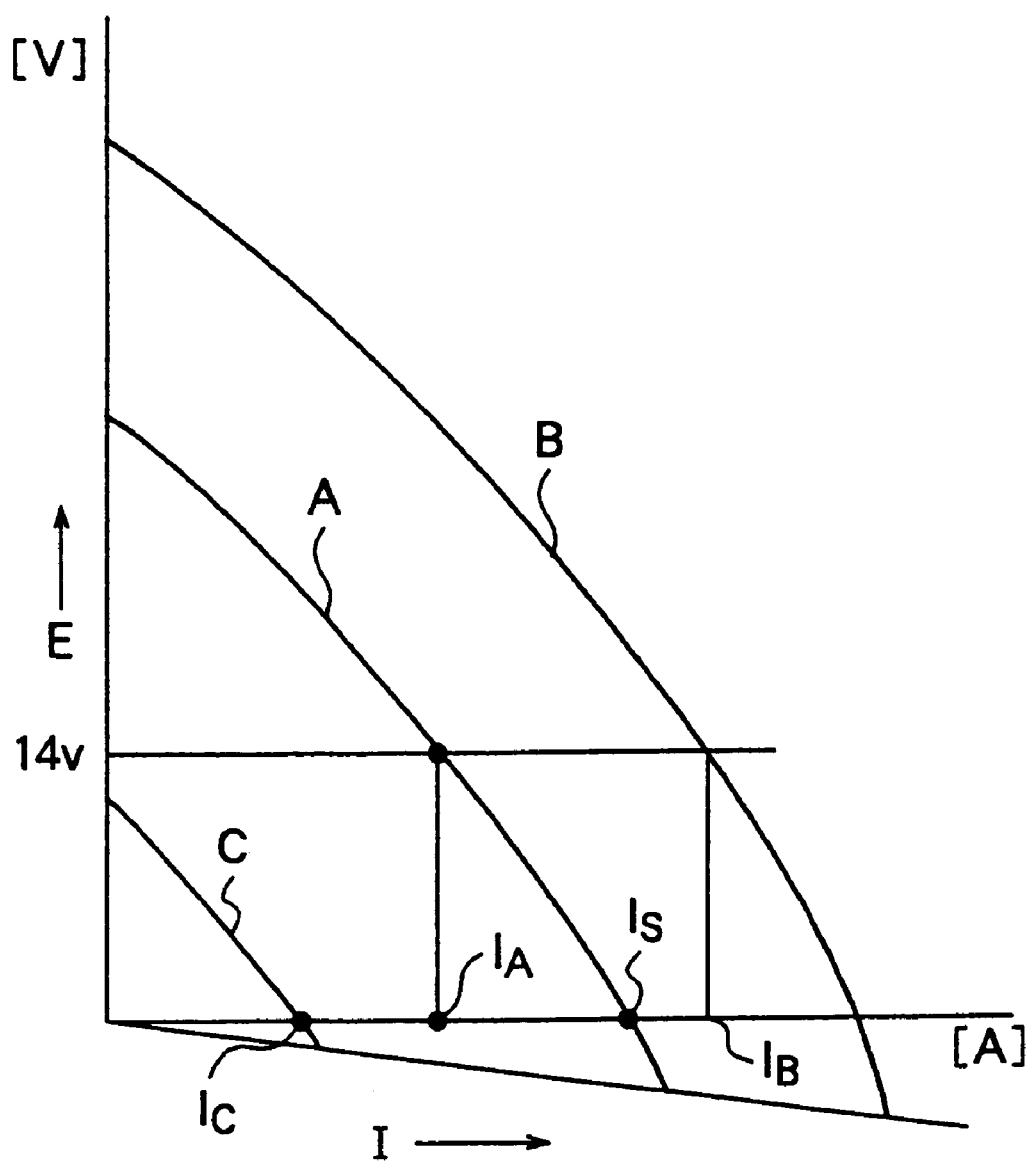
FIG. 18 is a graphical representation showing output voltage-output current characteristics of a magneto incorporated in a power device according to the present invention by way of example.

Supposing that output voltage E-output current I characteristics of the magneto obtained when the field adjusting excitation coil 5 is kept from being excited are as indicated at a curve A in FIG. 18, a charging current flowing to the battery 3 of 14V in voltage thereacross is permitted to be IA and a short-circuit current flowing therethrough when the output short-circuit thyristors Thu to Thw are turned on is permitted to be IS. On the contrary, output voltage E-output current I characteristics of the magneto obtained when the field adjusting excitation coil 5 is excited are as indicated at a curve C in FIG. 18 and a short-circuit current flowing therethrough when the output short-circuit thyristors Thu to Thw are turned on is permitted to be IC. Thus, it will be noted that the short-circuit current IC is substantially restricted as compared with the short-circuit current IS flowing therethrough when the field adjusting excitation coil 5 is kept from being turned on.

Thus, the short-circuit current flowing when the output short-circuit thyristors Thu to Thw are turned on is restricted to a reduced level, so that the thyristors may be reduced in current capacity as compared with the prior art. Also, this restrains generation of heat from the thyristors, to thereby attain small-sizing of a heat sink mounted on the thyristors Thu to Thw, resulting in the power device being small-sized as compared with the prior art.

In the embodiment shown in FIG. 7, a charging current is fed to the battery 3 acting as a load. However, it is a matter of course that the illustrated embodiment may be applied to feeding of an electric power to a DC load other than a battery.

Also, in the embodiment shown in FIG. 7, the switch control circuit 4 detects a voltage across the battery or load 3, resulting in generating a control signal when a voltage detected exceeds a set level, to thereby turn on the output short-circuit thyristors Thu to Thw. Alternatively, the switch control circuit may be constructed so as to detect a load current, resulting in generating a control signal when the load current exceeds a predetermined level.

Figure 8:
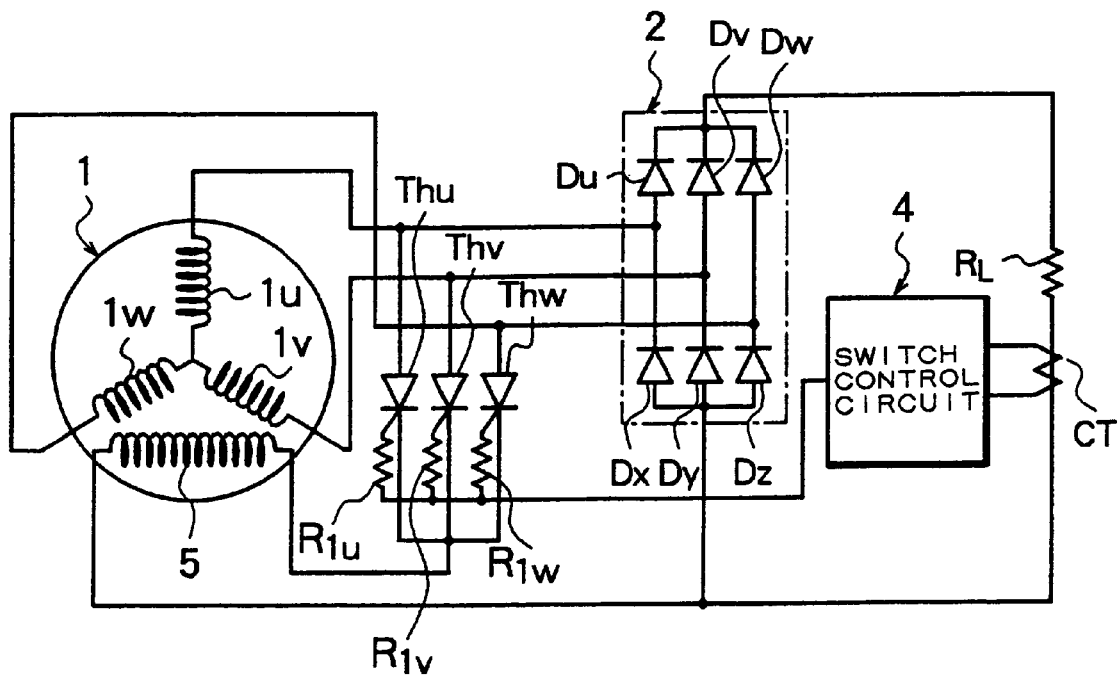
FIG. 8 is a circuit diagram showing a yet further embodiment of a magneto-equipped power device according to the present invention.

Referring now to FIG. 8, a further embodiment of a power device according to the present invention is illustrated. In a power device of the illustrated embodiment, a resistor load RL is connected across a rectification circuit 2, so that a switch control circuit 4 generates a control signal when a load current flowing through the resistor load RL exceeds a predetermined level. In the illustrated embodiment, a current transformer CT is arranged so as to function as a detector for detecting the load current, so that an output of the current transformer CT may be inputted to the switch control circuit 4. The switch control circuit 4 may be constituted of a load current detection circuit for outputting a detection signal containing information on a load current while receiving an output of the current transformer CT and a control signal generation circuit for generating a control signal when an output signal of the load current detection circuit exceeds a predetermined level.

Figure 9:
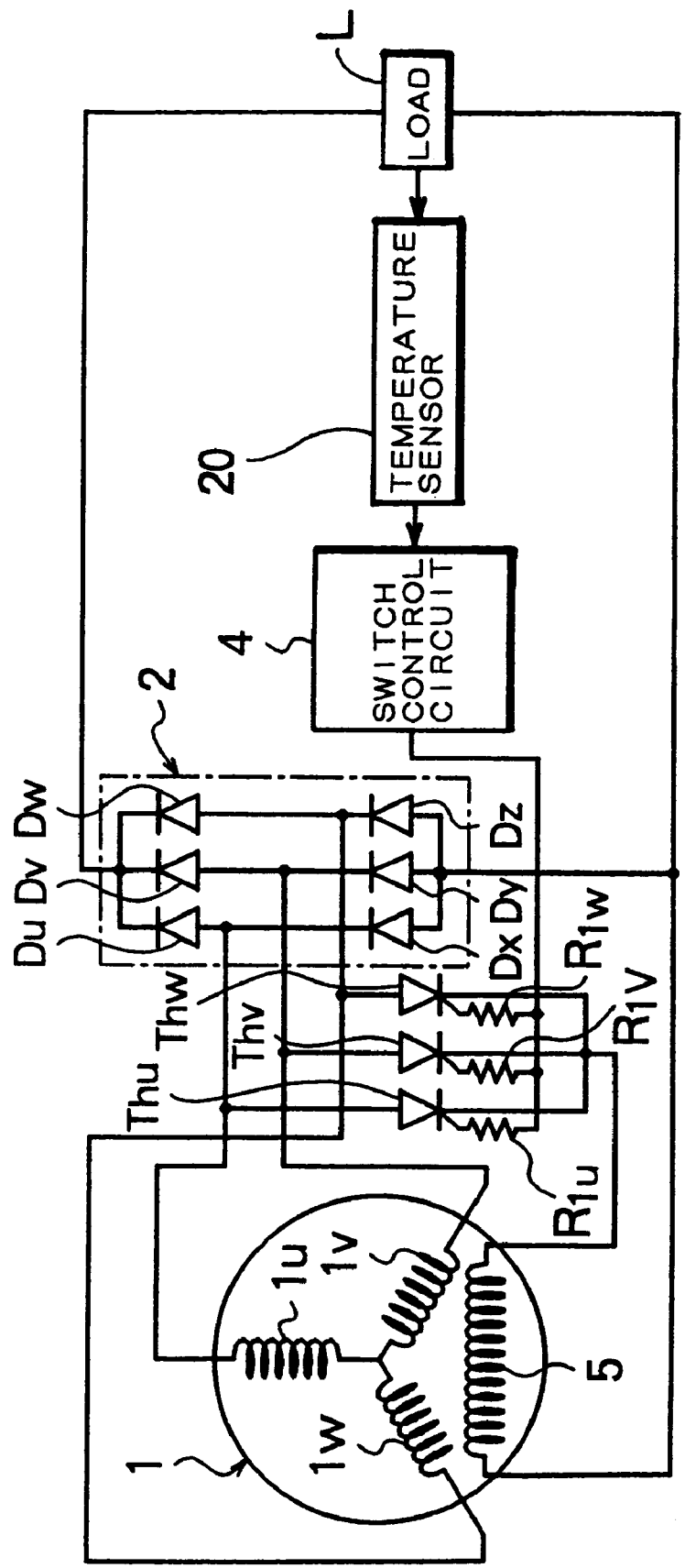
FIG. 9 is a circuit diagram showing an even further embodiment of a magneto-equipped power device according to the present invention.

Also, the present invention may be generally applied to not only the case that protection of a load is attained by short-circuiting an output of a magneto when a voltage across the load or a load current exceeds a predetermined level, but the case that the load is protected by short-circuiting the output of the magneto when the load falls into a state of requiring to restrain an output of the magneto. For example, the present invention may be constructed in such a manner as shown in FIG. 9, which illustrates a yet further embodiment of a power device according to the present invention.

In a power device of the illustrated embodiment, a temperature sensor 20 is arranged so as to detect a temperature of a load L, so that an output of a magneto is short-circuited to protect the load L, when a temperature of the load L exceeds a predetermined level. In this instance, a switch control circuit 4 includes a temperature detection circuit for outputting a detection signal containing information on a temperature of the load L from an output of the temperature sensor 20 and a control signal generation circuit for generating a control signal.

In the present invention, the field adjusting excitation coil 5 may be constituted of a field decreasing excitation coil and a field increasing excitation coil, wherein the field decreasing excitation coil is connected to an intermediate portion of the output short-circuiting circuit so as to be excited by a DC short-circuit current flowing through the output short-circuit switch and the field increasing excitation coil is connected to an intermediate portion of the current feed circuit for a load current so as to be excited by a DC load current flowing from the rectification circuit through the load.

In the power device thus constructed, the field decreasing excitation coil is wound in a direction which is determined so as to permit a magnet flux to be decreased when a field adjusting magnetic flux is generated due to excitation of the field decreasing excitation coil. Also, the field increasing excitation coil is wound in a direction which is determined so as to permit a magnet flux to be increased when a field adjusting magnetic flux is generated due to excitation of the field increasing excitation coil.

The field decreasing excitation coil and field increasing excitation coil may be constituted of coils wound separately from each other, respectively. Alternatively, the field adjusting coil may be constituted of a coil having a tap led out of an intermediate portion thereof, wherein the field decreasing excitation coil may be constituted by a portion of the coil defined between one end of the coil and the tap and the field increasing excitation coil may be constituted by a portion of the coil defined between the other end of the coil and the tap.

As described above, the present invention may be so constructed that the field adjusting excitation coil is constituted of the field decreasing excitation coil and field increasing excitation coil, resulting in a load current being flowed through the field increasing excitation coil when a state of the load does not require to restrain an output of the magneto and a DC short-circuit current which flows through the output short-circuiting circuit being flowed through the field decreasing excitation coil when the state requires to restrain the output. Such construction permits a magnet field to be increased to increase an output of the magneto when it is not required to restrain the output. Also, it permits a DC short-circuit current flowing through the output short-circuit switches to excite the field decreasing excitation coil to restrain an output of the magneto, to thereby reduce a short-circuit current flowing through the output short-circuit switches, when a state of the load requires to restrain an output of the magneto.

A state of the load that requires to restrain an output of the magneto means, for example, a state that a voltage across the load exceeds an allowable level, a state that a current of the load exceeds a limited level, a state that a temperature of the load exceeds an allowable level, or the like.

In the case that an output of the magneto is desired to be restrained when a voltage across the load exceeds an allowable level, the switch control circuit for feeding the output short-circuit switches with a control signal may constituted of a voltage detection circuit for detecting a voltage across the load and a control signal generation circuit for generating a control signal when a voltage detected by the voltage detection circuit exceeds a predetermined level.

In the case that an output of the magneto is desired to be restrained when a load current exceeds a limited level, the switch control circuit may be constituted of a load current detection circuit for detecting a load current and a control signal generation circuit for generating a control signal when a load current detected by the load current detection circuit exceeds a predetermined level.

Also, in the case that an output of the magneto is to be restrained when a temperature of the load exceeds an allowable level, the switch control circuit may be constituted of a temperature detection circuit for outputting a detection signal containing information on a temperature of the load while receiving an output of the temperature sensor detecting a temperature of the load and a control signal generating circuit for generating a control signal when a detection signal outputted from the temperature detection circuit exceeds a predetermined level.

Figure 10:
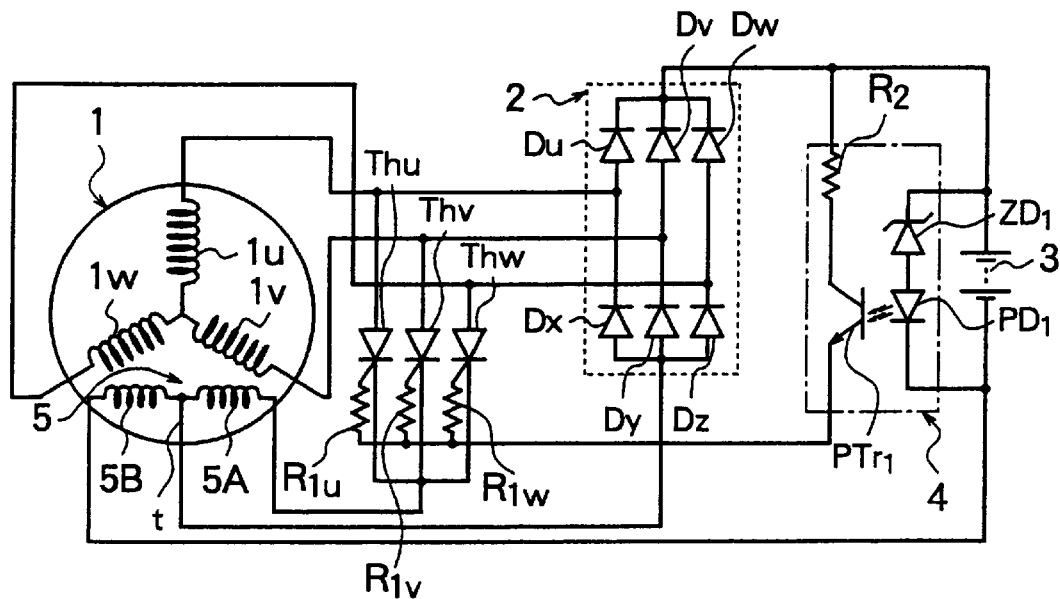
FIG. 10 is a circuit diagram showing another embodiment of a magneto-equipped power device according to the present invention.

Referring now to FIG. 10, another embodiment of a power device according to the present invention is illustrated, which is provided with such field decreasing and field increasing excitation coils as described above. More particularly, a field adjusting coil 5 has a tap t led out of an intermediate portion thereof.

A field decreasing excitation coil 5A is constituted by a portion of the coil 5 defined between one end of the coil 5 and the tap t and a field increasing excitation coil 5B is constituted by a portion of the coil 5 defined between the other end of the coil 5 and the tap t. The field decreasing excitation coil 5A is connected to an intermediate portion of an output short-circuiting circuit, to thereby be excited by a DC short-circuit current as in the embodiment shown in FIG. 7. The field increasing excitation coil 5B is connected between a negative terminal of a battery 3 and a negative output terminal of a rectification circuit 2, resulting in being charged by means of a charging current (load current) of the battery 3. The remaining part of the illustrated embodiment may be constructed in substantially the same manner as that of FIG. 7.

In the power device shown in FIG. 10, when a voltage across the battery 3 is at a predetermined level or below, the field increasing excitation coil 5 is charged by means of a charging current of the battery 3. Excitation of the field increasing excitation coil 5B permits such flowing of a field adjusting magnetic flux $\phi$ as shown in FIG. 7, resulting in a magnet field of a rotor of a magneto 1 being increased. At this time, output voltage E-output current I characteristics of the magneto are varied from a curve A to a curve B in FIG. 17, so that an output current of the magneto 1 is increased to IB in FIG. 18, resulting in a charging current fed to the battery 3 being increased. When charging of the battery 3 is advanced or a rotational speed of the magneto is increased, resulting in a voltage across the battery 3 exceeding a predetermined level, a switch control circuit 4 feeds the output short-circuit thyristors Thu to Thw with a trigger signal. This results in the thyristors being turned on to short-circuit an output of the magneto, so that an excitation current may be flowed through the field decreasing excitation coil 5A. Such short-circuiting of an output of the magneto due to turning-on of the thyristors Thu to Thw keeps a current from being fed toward the battery (load) 3, to thereby render the field increasing excitation coil 5B non-excited. This reduces a magnet field of the rotor, to thereby restrain an output of the magneto.

Figure 11:
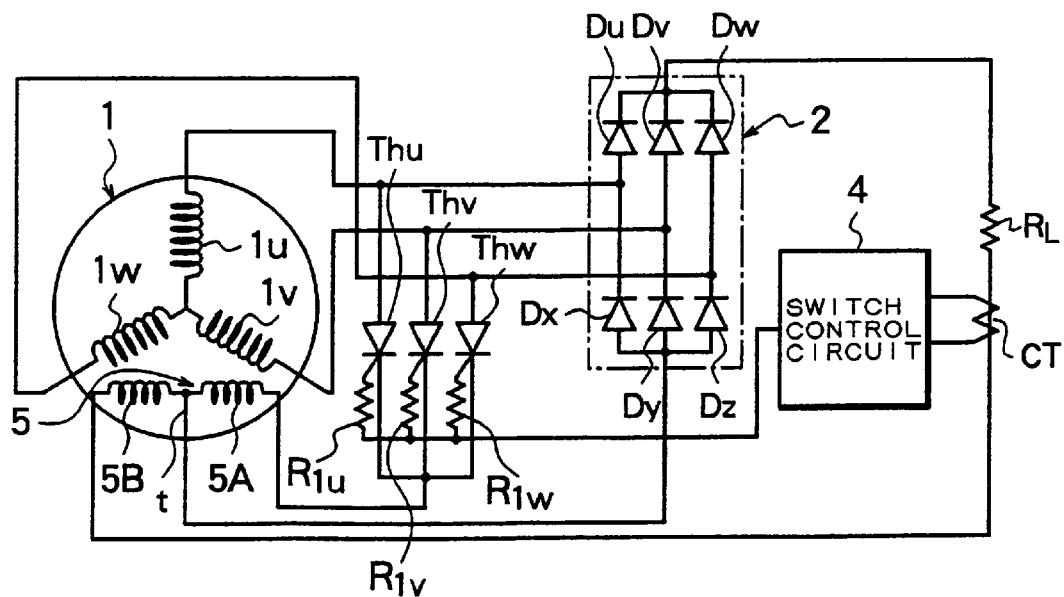
FIG. 11 is a circuit diagram showing an additional embodiment of a magneto-equipped power device according to the present invention.

Referring now to FIG. 11, an even further embodiment of a power device according to the present invention is illustrated. In a power device of the illustrated embodiment, a field decreasing excitation coil 5A and a field increasing excitation coil SB are arranged in order to feed an electric power from a magneto 1 through a rectification circuit 2 to a resistor load 2. The remaining part of the illustrated embodiment may be constructed in substantially the same manner as the embodiment of according to FIGS. 8 and 10.

In the present invention, a magnet field of the rotor 10 of the magneto 1 may be formed by a plurality of the permanent magnets and the ferromagnetic blocks arranged between the permanent magnets as shown in FIGS. 12 to 15. Such construction permits both field increasing magnetic flux and field decreasing magnetic flux to be flowed from the field adjusting excitation coil through the ferromagnetic blocks, to thereby facilitate a variation in magnet field.

However, the present invention is not limited to the construction that unmagnetized magnetic poles constituted by the ferromagnetic blocks are arranged between the permanent magnets so long as the magnet field can be varied due to flowing of the field adjusting magnetic flux from the field adjusting excitation coil to the magnetic path of the magnet field.

For example, supposing that permanent magnets which form all magnetic poles of a magnet field are magnetized in the same amount, excitation of the field adjusting excitation coil causes one of each adjacent two of the permanent magnets to be decreased in field and the other permanent magnet to be increased in field, so that the magnet field is considered to be unvaried as a whole. However, even when all magnetic poles of the magnet field are formed by permanent magnets and more specifically even when the ferromagnetic blocks m1 to m6 are replaced with permanent magnets magnetized at a magnetic polarity opposite to that of the permanent magnets M1 to M6 in FIGS. 12 and 13, it is possible to reduce the magnet field to restrain an output of the magneto by constructing the permanent magnets substituted for the ferromagnetic blocks m1 to m6 into a reduced volume as compared with the permanent magnets M1 to M6, as well as by permitting the field adjusting excitation coil 5 to generate a magnetic flux of a polarity which cancels a magnetic flux flowing through the permanent magnets M1 to M6 increased in volume or a polarity which increases a magnetic flux flowing through the permanent magnets substituted for the ferromagnetic blocks m1 to m6. In other words, generation of a magnetic flux having a polarity which cancels a magnetic flux flowing through the permanent magnets M1 to M6 from the field adjusting excitation coil 5 while reducing a volume of the permanent magnets substituted for the ferromagnetic blocks m1 to m6 as compared with that of the permanent magnets M1 to M6 permits a magnetic flux flowing through the permanent magnets M1 to M6 to be decreased while keeping magnetic saturation of the substituted permanent magnets, leading to a reduction in magnet field.

In each of the embodiments described above, the thyristors Thu to Thw each are used as each of the output short-circuit switches. Alternatively, bipolar transistors, FETs or the like may be substituted for the thyristors.

Also, the embodiments each are so constructed that an output of the magneto is short-circuited through the output short-circuit switches and the diodes Dx to Dz constituting the lower side of the bridge of the rectification circuit 2. Alternatively, when the armature coils $1u$ to $1w$ are subject to star connection, the output short-circuit switches each may be connected in parallel across each of the armature coils. In such parallel connection, it is required to use either a unidirectional switch element such as a thyristor or a bidirectional switch element such as an FET connected in series to a diode as each of the output short-circuit switches.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A magneto-equipped power device comprising:
   a magneto including a magnet field on a side of a rotor and armature coils on a side of a stator and including a field adjusting excitation coil for flowing a field adjusting magnetic flux through rotor-side magnetic poles and stator-side magnetic poles when it is excited, said field adjusting excitation coil being arranged on the side of the stator;
   a rectification circuit for rectifying an output of said magneto to feed it to a load;
   an output short-circuiting circuit for substantially short-circuiting an output of said armature coil of said magneto through output short-circuit switches turned on when a control signal is fed thereto, to thereby flow a DC short-circuit current through said output short-circuit switches; and
   a switch control circuit for feeding the control signal to said output short-circuit switches when a state of said load that requires to restrain an output of said magneto is detected;
   said field adjusting excitation coil being connected to an intermediate portion of said output short-circuiting circuit so as to be excited by the DC circuit-short current flowing through said output short-circuit switches;
   said magnet field of said rotor of said magneto being decreased when said field adjusting excitation coil is excited to generate the field adjusting magnetic flux.

2. A magneto-equipped power device as defined in claim 1, wherein said rotor of said magneto includes a rotor yoke formed into a cup-like shape, resulting in including a peripheral wall and a bottom wall and provided on a central portion of said bottom wall thereof with a boss section for mounting of a revolving shaft, a plurality of arcuate permanent magnets which are fixed on an inner peripheral surface of said peripheral wall of said rotor yoke while being arranged in a peripheral direction of said rotor yoke and are magnetized at the same polarity in a radial direction thereof, and ferromagnetic blocks of an arcuate shape each arranged between each adjacent two of said permanent magnets and fixed on said inner peripheral surface of said peripheral wall of said rotor yoke;

said permanent magnets and ferromagnetic blocks each having an inner peripheral surface constituting each of rotor-side magnetic poles;

said stator including an armature core having stator-side magnetic poles which are opposite to said rotor-side magnetic poles and armature coils wound on said armature core;

said field adjusting excitation coil being constituted by a coil wound so as to concentrically surround said boss section of said rotor yoke.

3. A magneto-equipped power device as defined in claim 1, wherein said state of said load that requires to restrain an output of said magneto is a state that a voltage across the load exceeds an allowable level; and said switch control circuit includes a voltage detection circuit for detecting a voltage across the load and a control signal generation circuit for generating a control signal when the voltage detected by said voltage detection circuit exceeds a predetermined level.

4. A magneto-equipped power device as defined in claim 1, wherein said state of said load that requires to restrain an output of said magneto is a state that a load current exceeds an allowable level; and said switch control circuit includes a load current detection circuit for detecting a load current and a control signal generation circuit for generating a control signal when the load signal detected by said load current detection circuit exceeds a predetermined level.

5. A magneto-equipped power device as defined in claim 1, wherein said state of said load that requires to restrain an output of said magneto indicates a state that a temperature of the load exceeds an allowable level; and said switch control circuit includes a temperature detection circuit for receiving an output of a temperature sensor for detecting a temperature of the load to output a detection signal containing information on a temperature of the load current and a control signal generation circuit for generating a control signal when the detection signal outputted from said load current detection circuit exceeds a predetermined level.

6. A magneto-equipped power device comprising:

a magneto including a rotor and a stator;

said rotor including a rotor yoke formed into a cup-like shape, resulting in including a peripheral wall and a bottom wall and provided on a central portion of said bottom wall thereof with a boss section for mounting of a revolving shaft, a plurality of arcuate permanent magnets which are fixed on an inner peripheral surface of said peripheral wall of said rotor yoke while being arranged in a peripheral direction of said rotor yoke and are magnetized at the same polarity in a radial direction thereof, and ferromagnetic blocks of an arcuate shape each arranged between each adjacent two of said permanent magnets and fixed on said inner peripheral surface of said peripheral wall of said rotor yoke;

said stator including an armature core having stator-side magnetic poles opposite to said rotor-side magnetic poles, armature coils wound said armature core and a field adjusting excitation coil for flowing through said rotor-side magnetic poles and stator-side magnetic poles when it is excited; and a rectification circuit for rectifying an output of said magneto to feed it to a load;

a change-over switch circuit arranged so as to connect a current feed circuit for a load current flowing through said load from said rectification circuit and said field adjusting excitation coil to each other therethrough, resulting in being changed over between a first state of connecting said current feed circuit and field adjusting excitation coil to each other in series so as to permit the load current to be flowed from one end of said field adjusting excitation coil to the other end thereof and a second state of connecting said current feed circuit and field adjusting excitation coil to each other in series so as to permit the load current to be flowed from the other end of said field adjusting excitation coil to the one end thereof; and a switch control circuit for changing over said change-over switch circuit depending on a current flowing through said load or a voltage thereacross;

said field adjusting excitation coil being wound in a direction which permits a field adjusting magnetic flux in a direction of increasing a magnetic flux flowing through said ferromagnetic blocks to be generated when said change-over switch circuit is at said first state and a field adjusting magnetic flux in a direction of decreasing the magnetic flux flowing through said ferromagnetic blocks to be generated when said change-over switch circuit is at said second state;

said switch control circuit controlling said change-over switch circuit so that said change-over switch circuit takes said first state when said load current or voltage is at a predetermined level or below and said second state when said load current or voltage exceeds a predetermined level.

* * * * *